US012233841B2

(12) United States Patent
Kawakami et al.

(10) Patent No.: US 12,233,841 B2
(45) Date of Patent: Feb. 25, 2025

(54) TRANSMISSION CONTROLLER

(71) Applicant: SUBARU CORPORATION, Tokyo (JP)

(72) Inventors: Akihiro Kawakami, Tokyo (JP); Kenji Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/673,575

(22) Filed: May 24, 2024

(65) Prior Publication Data
US 2024/0400033 A1 Dec. 5, 2024

(30) Foreign Application Priority Data

Jun. 1, 2023 (JP) .................................. 2023-090955

(51) Int. Cl.
B60W 10/11 (2012.01)
B60W 10/02 (2006.01)
(52) U.S. Cl.
CPC .......... B60W 10/11 (2013.01); B60W 10/026 (2013.01); B60W 2510/0233 (2013.01); B60W 2510/0638 (2013.01); B60W 2510/1015 (2013.01); B60W 2710/10 (2013.01)
(58) Field of Classification Search
CPC .............. B60W 10/11; B60W 10/026; B60W 2510/0638; B60W 10/101; B60W 10/107; B60W 2510/1005; B60W 2510/1015; B60W 2510/0233; B60W 2710/10; B60W 2710/1005; F16H 2059/366; F16H 2059/385; F16H 59/42; F16H 59/70; F16H 59/56

USPC .......................... 701/54, 57; 477/43, 44, 111
See application file for complete search history.

(56) References Cited

U.S. PATENT DOCUMENTS

| 5,871,417 A | 2/1999 | Suzuki |
| 11,035,464 B2* | 6/2021 | Komuro ................ B60W 10/06 |
| 2005/0096822 A1* | 5/2005 | Aoki ................. F16H 61/66259 701/55 |

FOREIGN PATENT DOCUMENTS

| JP | 3491423 B | 1/2004 |
| WO | WO-2019185146 A1 * | 10/2019 |

* cited by examiner

Primary Examiner — Roger L Pang
(74) Attorney, Agent, or Firm — TROUTMAN PEPPER LOCKE LLP

(57) ABSTRACT

A transmission controller is configured to control a transmission configured to transmit power between a primary shaft and a secondary shaft while changing a gear ratio between the primary shaft and the secondary shaft. includes at least one processor and at least one memory coupled to the at least one processor. The at least one processor is configured to perform processing including: performing first control for upshifting the transmission when a target rotational speed of the primary shaft reaches or exceeds a first threshold; and performing second control for upshifting the transmission when an engine speed reaches or exceeds a second threshold. The second control is executed when the target rotational speed is higher than or equal to a set value set for each gear of the transmission, and is not executed when the target rotational speed is lower than the set value.

4 Claims, 5 Drawing Sheets

TRANSMISSION CONTROLLER

CROSS-REFERENCE TO RELATED APPLICATIONS

The present application claims priority from Japanese Patent Application No. 2023-090955 filed on Jun. 1, 2023, the entire contents of which are hereby incorporated by reference.

BACKGROUND

The present disclosure relates to a transmission controller.

Conventional vehicles may be equipped with an automatic transmission and a controller for controlling the gear ratio of the automatic transmission. It is known that the controller for the automatic transmission has an automatic shift mode in which the gear ratio is automatically determined according to the vehicle speed and the accelerator opening. It is also known that the controller for the automatic transmission has, in addition to the automatic shift mode, a manual mode in which the gear ratio of the automatic transmission is set according to the gear selected by a driver operating a shift lever provided in a vehicle.

Japanese Patent No. 3491423 discloses a controller for a continuously variable transmission, the controller having an automatic shift mode and a manual mode. The controller automatically changes the gear ratio so that the engine speed or the input rotational speed of the continuously variable transmission does not exceed the allowable engine speed.

SUMMARY

An aspect of the disclosure provides a transmission controller configured to control a transmission. The transmission is configured to transmit power between a primary shaft and a secondary shaft while changing a gear ratio between the primary shaft and the secondary shaft, the transmission controller includes at least one processor and at least one memory coupled to the at least one processor. The at least one processor is configured to perform processing including: performing first control for upshifting the transmission when a target rotational speed of the primary shaft reaches or exceeds a first threshold; and performing second control for upshifting the transmission when an engine speed reaches or exceeds a second threshold. The second control is executed when the target rotational speed is higher than or equal to a set value set for each gear of the transmission, and is not executed when the target rotational speed is lower than the set value.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
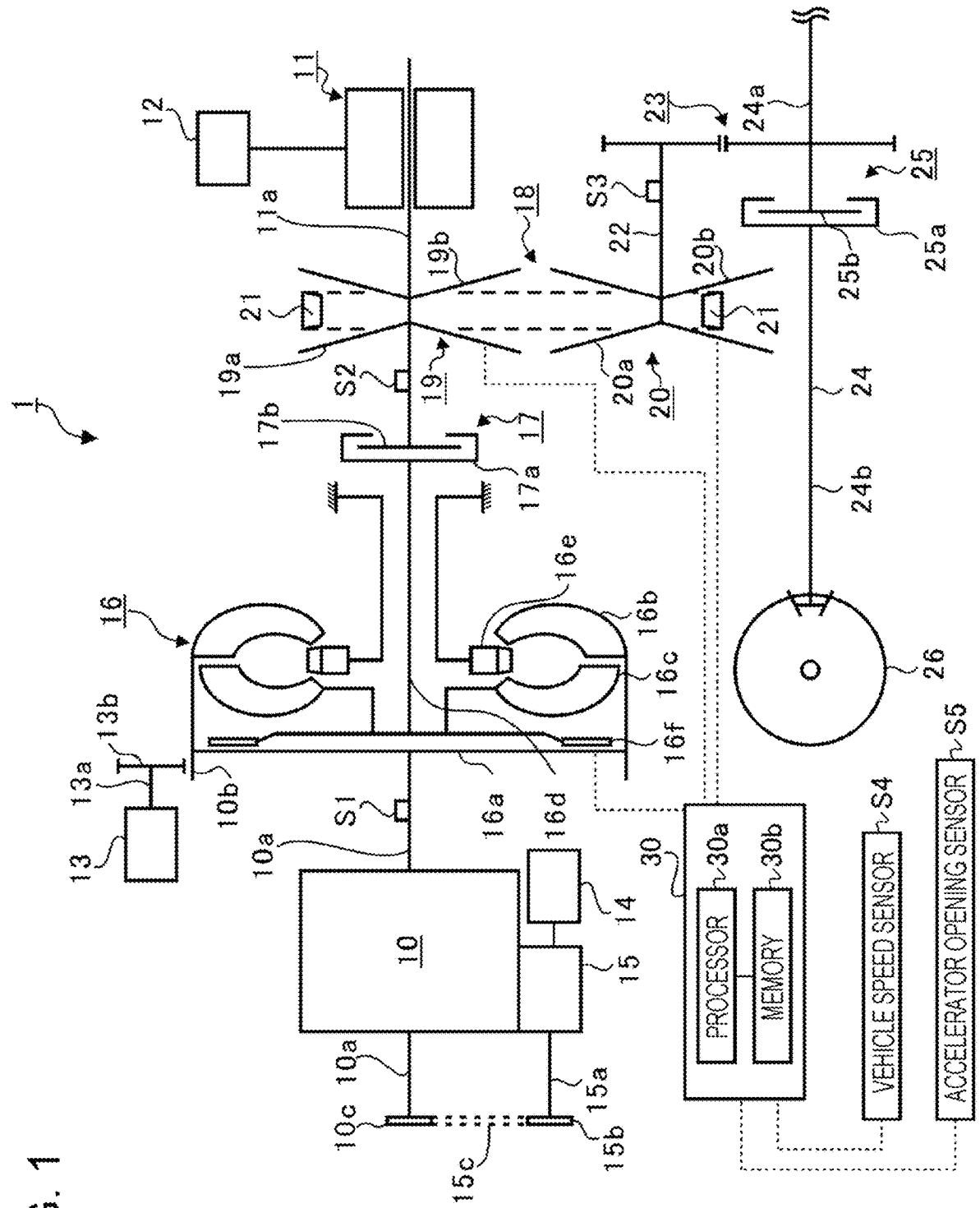
FIG. 1 schematically illustrates the configuration of a vehicle according to an embodiment of the present disclosure.

In the manual mode, auto-up control in which upshift is performed such that the input rotational speed of the continuously variable transmission does not exceed the allowable rotational speed and over-revolution determination in which upshift is performed such that the engine speed does not exceed the allowable rotational speed may be used in combination.

When the auto-up control and the over-revolution determination are used in combination, upshift by the auto-up control and upshift by the over-revolution determination are successively performed under a specific condition, causing two-gear upshift, which is problematic.

It is desirable to provide a transmission controller capable of preventing two-gear upshift.

Hereinbelow, an embodiment of the present disclosure will be described in detail with reference to the accompanying drawings. The dimensions, materials, and other specific numerical values described in the embodiment are merely examples for ease of understanding of the disclosure and do not limit the disclosure unless otherwise specified. In the specification and the drawings, elements having substantially the same functions and structures are denoted by the same reference numerals, and repeated description thereof will be omitted. In addition, elements not directly related to the present disclosure are not illustrated.

FIG. 1 schematically illustrates the configuration of a vehicle 1 according to the embodiment of the present disclosure. The vehicle 1 is a hybrid vehicle such as a hybrid electric vehicle (HEV) and includes an engine 10 and a driving motor 11. The vehicle 1 may further include various components besides the components described in this embodiment.

The engine 10 has a crankshaft 10a passing therethrough. An explosion pressure in a combustion chamber causes pistons to reciprocate, rotating the crankshaft 10a. A gear 10b and a pulley 10c are provided at the ends of the crankshaft 10a.

The driving motor 11 is, for example, a synchronous rotary electric machine. When the driving motor 11 serves as a power source, the driving motor 11 rotates a primary shaft 11a with electric power supplied from a high-voltage battery 12. When the driving motor 11 serves as a generator, the generated electric power is supplied to the high-voltage battery 12 to charge the high-voltage battery 12.

A starter 13 and an integrated starter generator (ISG) 15 are provided near the engine 10. The starter 13 starts the engine. However, the starter 13 is used only at the initial start of a drive cycle. A gear 13b is provided on a shaft 13a of the stator 13. The gear 13b is engaged with the gear 10b provided on the outer circumference of a torque converter 16, so that the power is transmitted between the shaft 13a and the crankshaft 10a.

The integrated starter generator (ISG) 15 assists the driving force of the engine 10. The ISG 15 also serves as a motor for starting the engine 10 that has been stopped to avoid idling, for example. When the ISG 15 serves as the starting motor, the ISG 15 rotates a shaft 15a with electric power supplied from an auxiliary battery 14. A belt 15c is stretched between a pulley 15b provided on the shaft 15a and the pulley 10c. The driving force of the ISG 15 is transmitted to the crankshaft 10a via the shaft 15a, the pulley 15b, the belt 15c, and the pulley 10c, to start the engine 10. The ISG 15 also serves as an alternator. When the ISG 15 serves as the alternator, the ISG 15 transmits the driving force of the engine 10 to the shaft 15a via the crankshaft 10a, the pulley 10c, the belt 15c, and the pulley 15b to generate electric power. The ISG 15 charges the auxiliary battery 14 with the generated electric power.

A transmission 18 is coupled to an end of the crankshaft 10a via the torque converter 16 and an input clutch 17.

The torque converter 16 includes a front cover 16a coupled to the crankshaft 10a and a pump impeller 16b fixed to the front cover 16a. In the front cover 16a, a turbine runner 16c is opposed to the pump impeller 16b. A turbine shaft 16d is coupled to the turbine runner 16c. A stator 16e is disposed between the pump impeller 16b and the turbine runner 16c, on the inner circumferential side of them, and the inside of the torque converter 16 is filled with a working fluid.

In the torque converter 16, when the pump impeller 16b rotates, the working fluid forced to the outer circumferential side flows into the turbine runner 16c, rotating the turbine runner 16c. This way, the power is transmitted from the crankshaft 10a to the turbine runner 16c.

The stator 16e changes the direction of flow of the working fluid flowing from the turbine runner 16c and guides the working fluid back to the pump impeller 16b to promote the rotation of the pump impeller 16b. Thus, the torque converter 16 can amplify the torque transmitted to the turbine shaft 16d.

Furthermore, in the torque converter 16, a lock-up clutch 16f fixed to the turbine shaft 16d is opposed to the inner surface of the front cover 16a. The lock-up clutch 16f can directly engage the crankshaft 10a with the turbine shaft 16d. In other words, the lock-up clutch 16f is switchable between a closed state in which the crankshaft 10a and the turbine shaft 16d are directly engaged with each other and an open state in which the crankshaft 10a and the turbine shaft 16d are not directly engaged with each other.

When the lock-up clutch 16f is open, the torque of the crankshaft 10a is amplified and transmitted to the turbine shaft 16d. When the lock-up clutch 16f is closed, the torque of the crankshaft 10a is directly transmitted to the turbine shaft 16d.

As described, when the lock-up clutch 16f is open, the torque converter 16 amplifies the torque of the crankshaft 10a and transmits the torque to the turbine shaft 16d. This in turn makes the rotational speed of the turbine shaft 16d lower than the rotational speed of the crankshaft 10a. This gives a driver a sense of slip that the vehicle 1 does not accelerate immediately even if the driver applies the accelerator pedal to increase the rotational speed of the engine 10.

In this case, by closing the lock-up clutch 16f, the crankshaft 10a is directly engaged with the turbine shaft 16d to cancel the function of the torque converter 16. Doing so eliminates the amplification of the torque transmitted from the crankshaft 10a to the turbine shaft 16d, and the rotational speed of the engine 10 is directly transmitted to the turbine shaft 16d. This allows the driver to enjoy driving without a sense of slip. Hereinbelow, the operation of directly engaging the crankshaft 10a with the turbine shaft 16d by means of the lock-up clutch 16f is referred to as lock-up.

In the input clutch 17, a fixed case 17a fixed to the turbine shaft 16d and a moving member 17b fixed to the primary shaft 11a are opposed to each other. The moving member 17b is moved toward the fixed case 17a by the pressure of working oil supplied from an oil-hydraulic pump (not illustrated).

The input clutch 17 disconnects transmission of power between the turbine shaft 16d and the primary shaft 11a in a disengaged state in which the fixed case 17a and the moving member 17b are separated from each other. The input clutch 17 transmits power between the turbine shaft 16d and the primary shaft 11a in an engaged state in which the moving member 17b is pressed against the fixed case 17a by the oil pressure.

The transmission 18 includes a primary pulley 19, a secondary pulley 20, and a belt 21. The primary pulley 19 is provided on the primary shaft 11a. The secondary pulley 20 is provided on a secondary shaft 22 disposed in parallel with the primary shaft 11a. The belt 21 is, for example, a chain belt formed by coupling link plates with pins, and is stretched between the primary pulley 19 and secondary pulley 20. The belt 21 transmits power between the primary pulley 19 and the secondary pulley 20.

The primary pulley 19 includes a fixed sheave 19a and a movable sheave 19b. The fixed sheave 19a and the movable sheave 19b are opposed to each other in the axial direction of the primary shaft 11a. The opposing faces of the fixed sheave 19a and the movable sheave 19b are substantially conical, forming a groove over which the belt 21 is stretched.

Similarly, the secondary pulley 20 includes a fixed sheave 20a and a movable sheave 20b. The fixed sheave 20a and the movable sheave 20b are opposed to each other in the axial direction of the secondary shaft 22. The opposing faces of the fixed sheave 20a and the movable sheave 20b are substantially conical, forming a groove over which the belt 21 is stretched.

The position of the movable sheave 19b of the primary pulley 19 in the axial direction of the primary shaft 11a can be changed by the pressure of oil supplied from an oil-hydraulic pump (not illustrated) via an oil-pressure control valve. The position of the movable sheave 20b of the secondary pulley 20 in the axial direction of the secondary shaft 22 can be changed by the pressure of oil supplied from an oil-hydraulic pump.

As described, the distance between the fixed sheave 19a and the movable sheave 19b of the primary pulley 19 is changeable, and the distance between the fixed sheave 20a and the movable sheave 20b of the secondary pulley 20 is changeable. The width of the groove in which the belt 21 is stretched is wide at the radially outer side and is narrow at the radially inner side of the fixed and movable sheaves 19a and 19b and the fixed and movable sheaves 20a and 20b. Hence, when the distance between the opposing conical faces is changed to change the width of the groove in which the belt 21 is stretched, the position where the belt 21 is stretched is changed.

In the transmission 18, when the position where the belt 21 is stretched is changed, the diameters of the pulleys 19 and 20 over which the belt 21 is wound are changed. In other words, the effective diameters of the primary pulley 19 and the secondary pulley 20 are variable. The transmission 18 transmits power between the primary shaft 11a and the secondary shaft 22 while changing the gear ratio therebetween. Thus, the transmission 18 serves as a continuously variable transmission that continuously changes the torque transmitted between the primary shaft 11a and the secondary shaft 22.

The secondary shaft 22 is coupled to an output shaft 24 via a gear mechanism 23. The output shaft 24 includes a first output shaft 24a and a second output shaft 24b. The gear mechanism 23 couples the secondary shaft 22 and the first output shaft 24a to each other to rotate them together. The first output shaft 24a and the second output shaft 24b are coupled to each other via an output clutch 25. The output clutch 25 includes a fixed case 25a fixed to the second output shaft 24b and a moving member 25b provided on the first output shaft 24a. The fixed case 25a and the moving member 25b are opposed to each other. The moving member 25b is moved toward the fixed case 25a by the pressure of working oil supplied from an oil-hydraulic pump (not illustrated).

The output clutch 25 disconnects transmission of power between the first output shaft 24a and the second output shaft 24b in the disengaged state in which the fixed case 25a and the moving member 25b are separated from each other. The output clutch 25 transmits power between the first output shaft 24a and the second output shaft 24b in the engaged state in which the moving member 25b is pressed against the fixed case 25a by the oil pressure. The power is output to a drive wheel 26 coupled to the second output shaft 24b. The output clutch 25 can adjust the capacity of torque transmitted between the first output shaft 24a and the second output shaft 24b according to the pressure of the working oil.

The output clutch 25, which has a smaller torque capacity than the transmission 18, transmits torque from the transmission 18 to the drive wheel 26. When a torque, such as a disturbance, larger than the torque capacity of the output clutch 25 is input from the drive wheel 26, the moving member 25b slips with respect to the fixed case 25a. Thus, the torque transmitted to the output clutch 25 is limited to a level smaller than or equal to the torque capacity of the output clutch 25. Therefore, the output clutch 25 does not transmit, to the transmission 18, a torque larger than the torque capacity of the transmission 18. Hence, the output clutch 25 serves as a torque fuse.

The vehicle 1 is provided with a crank angle sensor S1, a primary rotational speed sensor S2, a secondary rotational speed sensor S3, a vehicle speed sensor S4, and an accelerator opening sensor S5. The crank angle sensor S1, the primary rotational speed sensor S2, the secondary rotational speed sensor S3, the vehicle speed sensor S4, and the accelerator opening sensor S5 are electrically coupled to the controller 30 by signal wires.

The crank angle sensor S1 is provided on the crankshaft 10a, detects the rotational speed of the crankshaft 10a, that is, the rotational speed of the engine 10 (hereinbelow, the engine speed), and outputs a signal indicating the engine speed to the controller 30.

The primary rotational speed sensor S2 is provided on the primary shaft 11a, detects the rotational speed of the primary shaft 11a (hereinbelow, the primary rotational speed), and outputs a signal indicating the primary rotational speed to the controller 30.

The secondary rotational speed sensor S3 is provided on the secondary shaft 22, detects the rotational speed of the secondary shaft 22 (hereinbelow, the secondary rotational speed), and outputs a signal indicating the secondary rotational speed to the controller 30.

The vehicle speed sensor S4 detects the vehicle speed of the vehicle 1 and outputs a signal indicating the vehicle speed to the controller 30. The accelerator opening sensor S5 detects the depression amount of an accelerator pedal (not illustrated) provided in the vehicle 1 and outputs a signal indicating the depression amount to the controller 30.

The controller 30 is coupled to the respective components, including the engine 10 and the driving motor 11, described above and controls the entire vehicle 1. In this embodiment, details of the control of the transmission 18 performed by the controller 30 will be mainly described in detail.

The controller 30 includes at least one processor 30a and at least one memory 30b. The processor 30a includes, for example, a central processing unit (CPU). The memory 30b includes, for example, a read-only memory (ROM) and a random-access memory (RAM). The ROM stores programs, operation parameters, and the like used by the CPU. The RAM temporarily stores data, such as variables and parameters, used for processing executed by the CPU.

Figure 2:
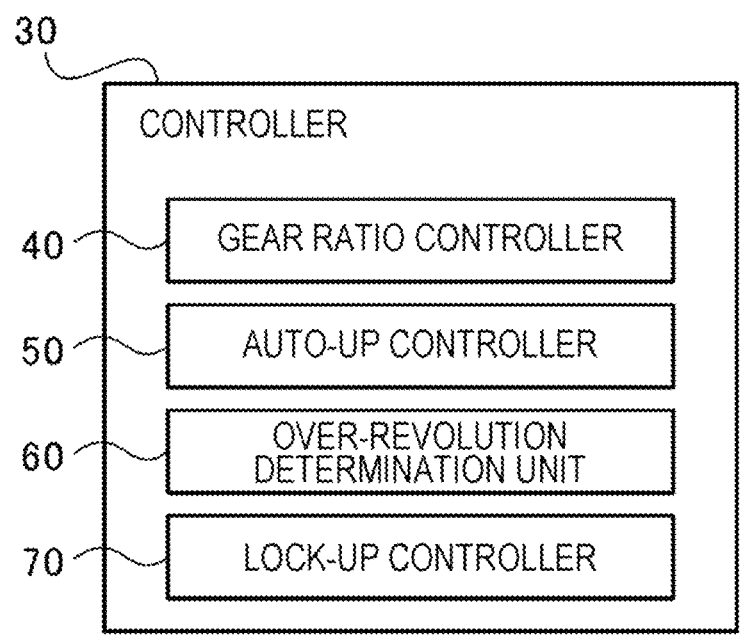
FIG. 2 is a block diagram illustrating an example functional configuration of a controller according to the embodiment.

FIG. 2 is a block diagram illustrating an example functional configuration of the controller 30 according to this embodiment. For example, as illustrated in FIG. 2, the controller 30 includes a gear ratio controller 40, an auto-up controller 50, an over-revolution determination unit 60, and a lock-up controller 70.

The processor 30a executes the program stored in the memory 30b to perform various processing, including the processing described below performed by the gear ratio controller 40, the auto-up controller 50, the over-revolution determination unit 60, and the lock-up controller 70.

The gear ratio controller 40 controls the gear ratio of the transmission 18. The gear ratio controller 40 has an automatic shift mode and a manual mode. In the automatic shift mode, the gear ratio is automatically controlled in accordance with the vehicle speed and the accelerator opening. In the manual mode, the gear ratio of the transmission 18 is controlled in accordance with the gear selected by the driver operating a shift lever (not illustrated) provided in the vehicle 1.

In this embodiment, in the manual mode, the gear ratio controller 40 derives a target gear ratio based on the vehicle speed and the gear. Then, the gear ratio controller 40 multiplies the secondary rotational speed detected by the secondary rotational speed sensor S3 by the target gear ratio to derive a target primary rotational speed. The gear ratio controller 40 controls the gear ratio of the transmission 18 such that the primary rotational speed detected by the primary rotational speed sensor S2 equals the target primary rotational speed. Hereinbelow, the target primary rotational speed is also simply referred to as a target rotational speed.

In the manual mode, the auto-up controller 50 upshifts the transmission 18 when the primary rotational speed or the target rotational speed reaches or exceeds a first threshold. As described above, because the primary rotational speed is controlled so as to be closer to the target rotational speed, when the primary rotational speed and the target rotational speed are close to each other, the auto-up controller 50 performs upshift control using either the primary rotational speed or the target rotational speed. Hereinbelow, the control for upshifting the transmission 18 by the auto-up controller 50 is also referred to as auto-up control (first control).

In the manual mode, the over-revolution determination unit 60 upshifts the transmission 18 when the engine speed detected by the crank angle sensor S1 reaches or exceeds a second threshold. Hereinbelow, the control for upshifting the transmission 18 by the over-revolution determination unit 60 is also referred to as over-revolution determination (second control).

The lock-up controller 70 controls the lock-up clutch 16f such that the lock-up clutch 16f is in an open state or a closed state. For example, the lock-up controller 70 controls and opens the lock-up clutch 16f when the rotational speed of the turbine shaft 16d is lower than a certain speed. Meanwhile, the lock-up controller 70 controls and closes the lock-up clutch 16*f* when the rotational speed of the turbine shaft 16*d* is higher than or equal to the certain speed.

In the manual mode, the auto-up controller 50 performs the auto-up control when the primary rotational speed or the target rotational speed reaches or exceeds the first threshold. In the manual mode, the over-revolution determination unit 60 performs the over-revolution determination when the engine speed reaches or exceeds the second threshold.

When the auto-up control and the over-revolution determination are performed successively, unintentional two-gear upshift may occur instead of intended one-gear upshift.

Figure 3:
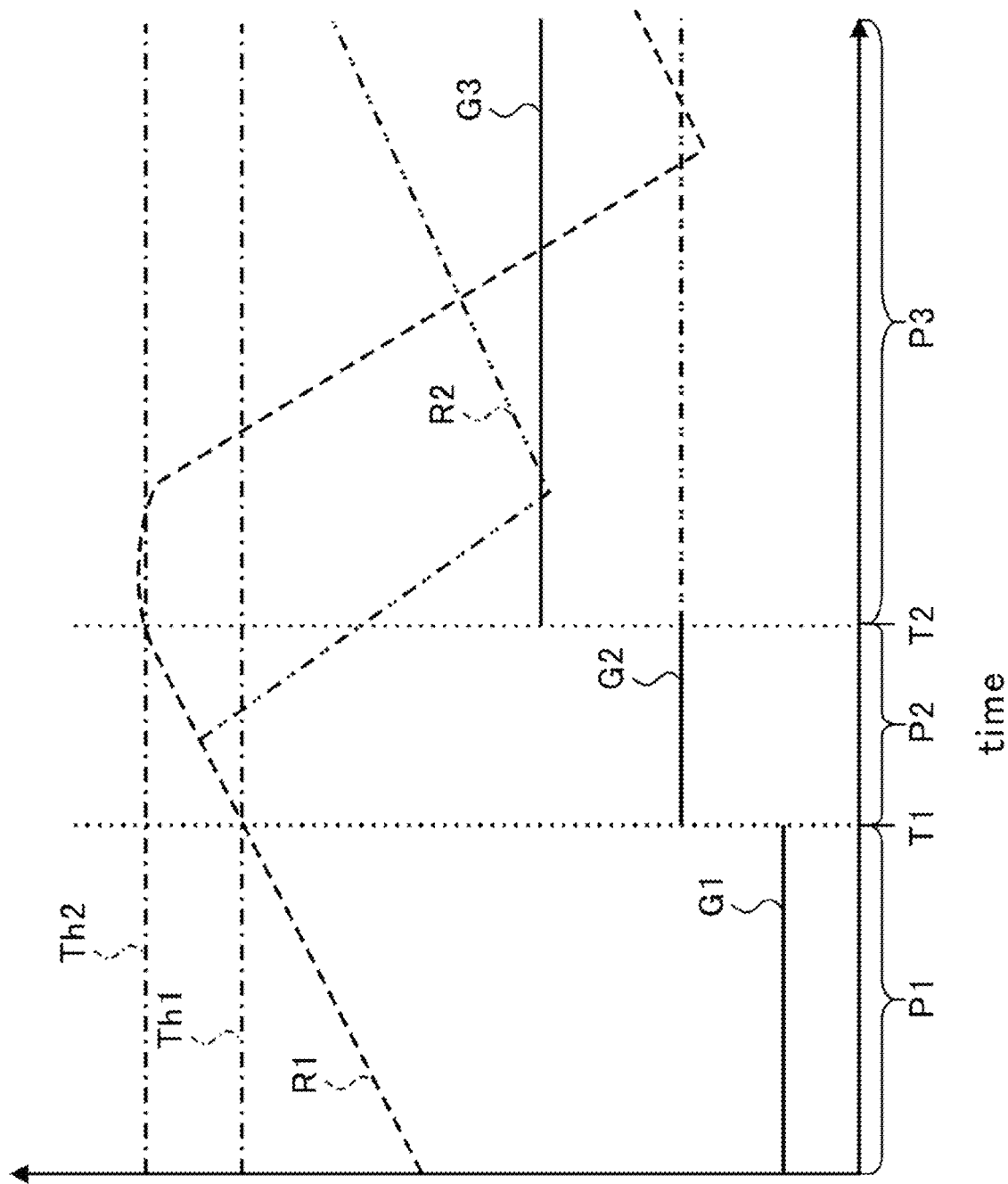
FIG. 3 is a graph illustrating the occurrence of two-gear upshift.

FIG. 3 is a graph illustrating the occurrence of two-gear upshift. In FIG. 3, solid lines G1, G2, and G3 indicate target gears, in which G1 is the first gear, G2 is the second gear, and G3 is the third gear. The second gear is one gear higher than the first gear, and the third gear is one gear higher than the second gear.

Dashed line R1 and two-dot chain line R2 indicate the engine speed and the primary rotational speed. Dashed line R1 indicates the engine speed and the primary rotational speed when gear change delay occurs, and two-dot chain line R2 indicates the engine speed and the primary rotational speed when gear change delay does not occur.

One-dot chain lines Th1 and Th2 indicate the first threshold and the second threshold, respectively. In FIG. 3, line Th1 indicates the first threshold, and line Th2 indicates the second threshold. The horizontal axis represents time.

As illustrated in FIG. 3, in period P1 before time T1, the target gear is set to the first gear G1, and the engine speed and the primary rotational speed R1 gradually increase with the vehicle speed.

At time T1, the engine speed and the primary rotational speed R1 reach the first threshold Th1. At this time, because the primary rotational speed R1 is higher than or equal to the first threshold Th1, the auto-up controller 50 performs the auto-up control for changing the target gear from the first gear G1 to the second gear G2.

In period P2 between time T1 and time T2, the engine speed and the primary rotational speed R2 indicated by the two-dot chain line gradually decrease as a result of the target gear being changed from the first gear G1 to the second gear G2. After the change to the second gear G2 is completed, the engine speed and the primary rotational speed R2 gradually increase with the vehicle speed.

In period P2 and period P3 after time T2, the engine speed and the primary rotational speed R2 do not exceed the second threshold Th2. Hence, the target gear is maintained at the second gear G2 in period P3, as illustrated by a two-dot chain line in FIG. 3.

In some cases, in period P2, gear change from the first gear G1 to the second gear G2 is delayed, allowing the engine speed and the primary rotational speed R1 to reach or exceed the second threshold Th2. The delay in the gear change from the first gear G1 to the second gear G2 is the gear change delay caused by, for example, individual differences of the components mounted in the vehicle 1 and a delayed response to the hydraulic control.

At time T2, the engine speed and the primary rotational speed R1 indicated by dashed line reach the second threshold Th2. At this time, because the engine speed R1 is higher than or equal to the second threshold Th2, the over-revolution determination unit 60 performs the over-revolution determination and performs processing for changing the target gear from the second gear G2 to the third gear G3.

When the gear change delay occurs like this, the auto-up control and the over-revolution determination are performed successively, causing unintentional two-gear upshift, in which upshift occurs successively, instead of intended one-gear upshift.

To prevent the two-gear upshift, the over-revolution determination unit 60 according to this embodiment limits the conditions for performing the over-revolution determination. The conditions for performing the over-revolution determination with the over-revolution determination unit 60 according to this embodiment will be described in detail below.

Figure 4:
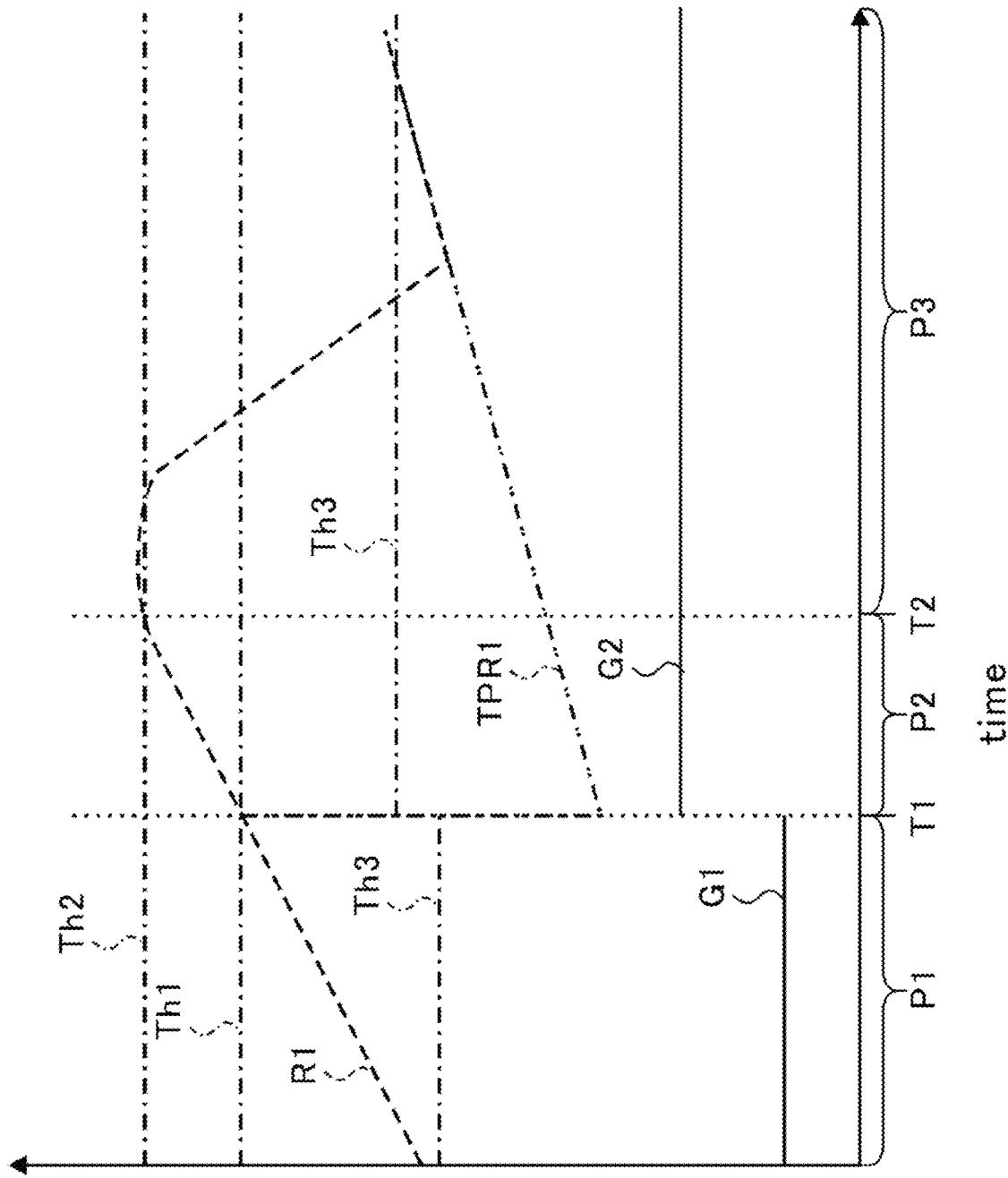
FIG. 4 is a graph illustrating processing in over-revolution determination according to the embodiment.

FIG. 4 is a graph illustrating processing in the over-revolution determination according to the embodiment. In FIG. 4, solid lines G1 and G2 indicate target gears, in which G1 is the first gear, and G2 is the second gear. The second gear is one gear higher than the first gear. The first gear G1 and the second gear G2 illustrated in FIG. 4 are the same as the first gear G1 and the second gear G2 illustrated in FIG. 3.

Dashed line R1 indicates the engine speed and the primary rotational speed when the gear change delay occurs. Two-dot chain line TPR1 indicates the target rotational speed of the primary shaft 11*a* derived by the gear ratio controller 40. The method for deriving the target rotational speed has been described above.

One-dot chain lines Th1 and Th2 indicate the first threshold and the second threshold, respectively. In FIG. 4, line Th1 indicates the first threshold, and line Th2 indicates the second threshold. The first threshold Th1 and the second threshold Th2 illustrated in FIG. 4 are the same as the first threshold Th1 and the second threshold Th2 illustrated in FIG. 3.

One-dot chain line Th3 indicates set values set for the respective gears of the transmission 18. The set values are obtained in advance by experiments or the like. In this embodiment, the set value for a gear having a higher gear ratio, i.e., a lower gear, is set to be a smaller value than the set value for a gear having a lower gear ratio, i.e., a higher gear. Furthermore, the set value when the lock-up clutch 16*f* is closed is set to be a smaller value than the set value when the lock-up clutch 16*f* is open.

As illustrated in FIG. 4, in period P1 before time T1, the target gear is set to the first gear G1, and the engine speed and the primary rotational speed R1 gradually increase with the vehicle speed.

At time T1, the engine speed and the primary rotational speed R1 reach the first threshold Th1. At this time, because the primary rotational speed R1 is higher than or equal to the first threshold Th1, the auto-up controller 50 performs the auto-up control for changing the target gear from the first gear G1 to the second gear G2.

Furthermore, in period P2 between time T1 and time T2, as a result of the above-described gear change delay, i.e., the delay in the gear change from the first gear G1 to the second gear G2, the engine speed and the primary rotational speed R1 reach the second threshold Th2 at time T2.

At this time, the over-revolution determination unit 60 determines whether the target rotational speed TPR1 is higher than or equal to the set value Th3. Then, depending on the determination result, the over-revolution determination unit 60 determines whether to perform the over-revolution determination.

For example, the over-revolution determination unit 60 performs the over-revolution determination when the target rotational speed TPR1 is higher than or equal to the set value Th3, and does not perform the over-revolution determination when the target rotational speed TPR1 is lower than the set value Th3.

At time T2, the target rotational speed TPR1 is lower than the set value Th3. Hence, even when the primary rotational speed R1 has reached the second threshold Th2 at time T2, the over-revolution determination unit 60 does not perform the upshift control, and the target gear is maintained at the second gear G2.

As described, the over-revolution determination unit 60 according to this embodiment performs the over-revolution determination when the target rotational speed TPR1 is higher than or equal to the set value Th3, and does not perform the over-revolution determination when the target rotational speed TPR1 is lower than the set value Th3. This prevents two-gear upshift caused by the gear change delay.

The set values Th3 according to this embodiment are set for the respective gears of the transmission 18, and the set value Th3 for a gear having a higher gear ratio is set to be a smaller value than the set value Th3 for a gear having a lower gear ratio. Thus, appropriate set values Th3 are set for the respective gears, and two-gear upshift is effectively prevented at every gear.

Furthermore, in this embodiment, the set values Th3 differ depending on the state of the lock-up clutch 16f. For example, the set value Th3 when the lock-up clutch 16f is closed is set to be a smaller value than the set value Th3 when the lock-up clutch 16f is open. The primary rotational speed when the lock-up clutch 16f is closed tends to be higher than that when the lock-up clutch 16f is open. Thus, to make it difficult for the primary rotational speed to exceed the allowable rotational speed, the set value Th3 when the lock-up clutch 16f is closed is set to be a smaller value than the set value Th3 when the lock-up clutch 16f is open.

Figure 5:
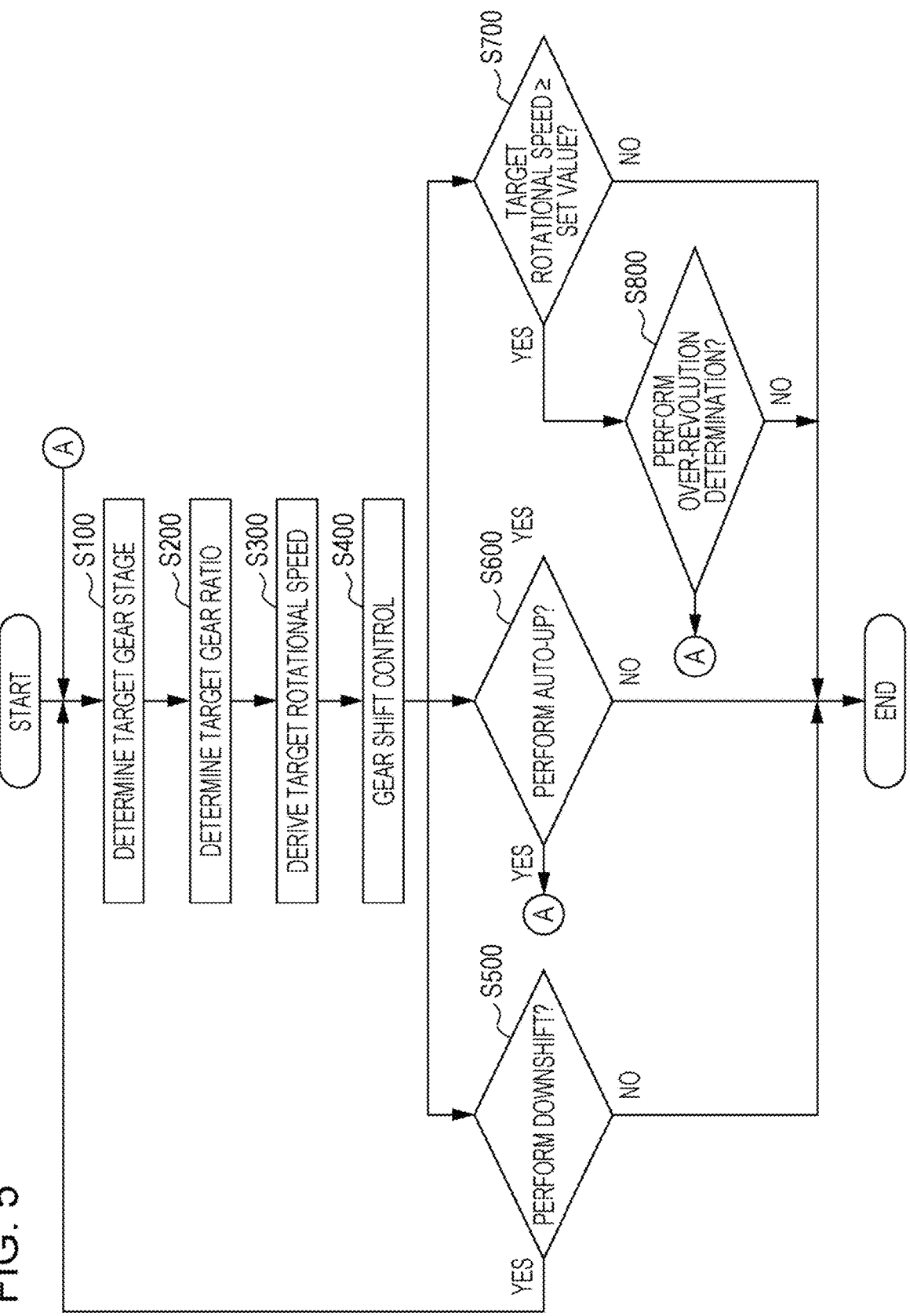
FIG. 5 is a flowchart illustrating a flow of processing performed by the controller according to the embodiment.

FIG. 5 is a flowchart illustrating a flow of processing performed by the controller 30 according to this embodiment. FIG. 5 illustrates the flow of processing performed by the controller 30 in the manual mode. As illustrated in FIG. 5, first, the gear ratio controller 40 determines the target gear based on the gear selected by the driver operating the shift lever (not illustrated) (step S100).

Next, the gear ratio controller 40 determines the target gear ratio based on the determined target gear and the vehicle speed acquired from the vehicle speed sensor S4 (step S200). Note that the target gear ratios are associated with the vehicle speeds and the target gears and are stored in the form of a map in a storage unit (not illustrated) of the controller 30. The target gear ratios are lower for higher vehicle speeds and are lower for higher target gears. The gear ratio controller 40 derives the target rotational speed based on the determined target gear ratio and the value acquired from the secondary rotational speed sensor S3 (step S300). For example, the gear ratio controller 40 derives the target rotational speed by multiplying the secondary rotational speed by the target gear ratio. The gear ratio controller 40 controls the gear ratio such that the value acquired from the primary rotational speed sensor S2 equals the target rotational speed (step S400).

The gear ratio controller 40 determines whether to perform downshift based on the value acquired from the vehicle speed sensor S4 and the value acquired from the accelerator opening sensor S5 (step S500). If it is determined that downshift is performed (YES in step S500), the process returns to step S100, and the gear ratio controller 40 determines that the target gear is a gear that is one stage lower than the current gear.

The auto-up controller 50 determines whether the primary rotational speed or the target rotational speed is higher than or equal to the first threshold Th1 (step S600). If it is determined that the primary rotational speed or the target rotational speed is higher than or equal to the first threshold Th1 (YES in step S600), the auto-up controller 50 performs the auto-up control, and it is determined in step S100 that the target gear is a gear that is one gear higher than the current gear.

The over-revolution determination unit 60 determines whether the target rotational speed TPR1 is higher than or equal to the set value Th3 (step S700). When it is determined that the target rotational speed TPR1 is higher than or equal to the set value Th3 (YES in step S700), the over-revolution determination unit 60 permits execution of the over-revolution determination, and, when it is determined that the target rotational speed TPR1 is lower than the set value Th3 (NO in step S700), the over-revolution determination unit 60 does not permit execution of the over-revolution determination.

When it is determined that the target rotational speed TPR1 is higher than or equal to the set value Th3 (YES in step S700), the over-revolution determination unit 60 determines whether the engine speed is higher than or equal to the second threshold Th2 (step S800). When it is determined that the engine speed is higher than or equal to the second threshold Th2, the over-revolution determination unit 60 performs the over-revolution determination, and it is determined in step S100 that the target gear is a gear that is one gear higher than the current gear.

Although the embodiment of the present disclosure has been described above with reference to the accompanying drawings, the present disclosure is not limited to such embodiment. It is apparent that those skilled in the art can conceive various modifications or corrections within the scope described in the claims, and it is understood that such modifications or corrections belong to the technical scope of the present disclosure.

The series of processing performed by the controller 30 according to this embodiment described above may be implemented by using any of software, hardware, and a combination of software and hardware. A program constituting the software is stored in advance in, for example, a non-transitory storage medium provided inside or outside the device. The program is read from the non-transitory storage medium (for example, a ROM) into a transitory storage medium (for example, a RAM) and is executed by a processor, such as a CPU.

Programs for implementing the functions of the above-described devices may be created and installed in computers of the devices. As a result of processors executing the programs stored in memories, the processing for implementing the above-described functions is executed. At this time, execution of each program may be shared by multiple processors, or may be performed by a single processor. Furthermore, the functions of the devices may be implemented by using cloud computing, in which multiple computers are coupled to one another via a communication network. The programs may be distributed from an external device through a communication network and installed in the computers of the devices.

In the above embodiment, an example in which the auto-up control is performed in the manual mode has been described. However, the present disclosure may be applied to control for performing similar upshift in the automatic shift mode. In the above embodiment, the example in which the auto-up control is performed based on the primary rotational speed or the target rotational speed has been described. However, the present disclosure is not limited thereto, and the auto-up control may be performed based on the rotational speed of the turbine shaft 16d or the vehicle speed and the accelerator opening instead of the primary rotational speed or the target rotational speed. In the above embodiment, an example in which the gear shift control is performed based on the primary rotational speed has been described. However, the present disclosure is not limited thereto, and the gear shift control may be performed based on the rotational speed of the turbine shaft 16*d* instead of the primary rotational speed.

In the above embodiment, an example in which the target rotational speed is derived based on the secondary rotational speed has been described. However, the present disclosure is not limited thereto, and the target rotational speed may be derived based on the rotational speed of the output shaft 24 instead of the secondary rotational speed.

The present disclosure prevents two-gear upshift.

The controller 30 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 30 including the gear ratio controller 40, the auto-up controller 50, the over-revolution determination unit 60, and the lock-up controller 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A transmission controller configured to control a transmission, the transmission being configured to transmit power between a primary shaft and a secondary shaft while changing a gear ratio between the primary shaft and the secondary shaft, the transmission controller comprising:
   at least one processor; and
   at least one memory coupled to the at least one processor, the at least one processor being configured to perform processing including:
      performing first control for upshifting the transmission when a target rotational speed of the primary shaft reaches or exceeds a first threshold; and
      performing second control for upshifting the transmission when an engine speed reaches or exceeds a second threshold,
   wherein the second control is executed when the target rotational speed is higher than or equal to a set value set for each gear of the transmission, and is not executed when the target rotational speed is lower than the set value.

2. The transmission controller according to claim 1, wherein the set value for a gear having a higher gear ratio is set to be a smaller value than the set value for a gear having a lower gear ratio.

3. The transmission controller according to claim 1, wherein the set value when a lock-up clutch of a torque converter is closed is set to be a smaller value than the set value when the lock-up clutch is open.

4. The transmission controller according to claim 2, wherein the set value when a lock-up clutch of a torque converter is closed is set to be a smaller value than the set value when the lock-up clutch is open.

* * * * *